US012722922B2

(12) United States Patent
Ito et al.

(10) Patent No.: US 12,722,922 B2
(45) Date of Patent: Sep. 1, 2026

(54) PAPER FEED ROLL

(71) Applicant: Sumitomo Riko Company Limited, Aichi (JP)

(72) Inventors: Daiki Ito, Aichi (JP); Kaoru Kato, Aichi (JP); Wataru Imamura, Aichi (JP); Satoshi Endo, Aichi (JP); Manabu Sakuda, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 74 days.

(21) Appl. No.: 18/735,161

(22) Filed: Jun. 5, 2024

(65) Prior Publication Data

US 2024/0317520 A1 Sep. 26, 2024

Related U.S. Application Data

(63) Continuation of application No. PCT/JP2023/000624, filed on Jan. 12, 2023.

(30) Foreign Application Priority Data

Jan. 28, 2022 (JP) ................................ 2022-011856

(51) Int. Cl.
*B65H 5/06* (2006.01)
*B65H 3/06* (2006.01)
*F16C 13/00* (2006.01)

(52) U.S. Cl.
CPC ................ *B65H 5/06* (2013.01); *B65H 3/06* (2013.01); *B65H 3/0638* (2013.01); *F16C 13/00* (2013.01);

(Continued)

(58) Field of Classification Search
CPC ...... B65H 2404/13163; B65H 2515/84; B65H 3/0638; B65H 5/06; B65H 2404/1115
See application file for complete search history.

(56) References Cited

U.S. PATENT DOCUMENTS 7,703,761 B2 * 4/2010 Shiraki .................... B65H 5/06 492/30
9,790,041 B2 * 10/2017 Doi ........................ F16C 13/00

FOREIGN PATENT DOCUMENTS

CN 101139048 3/2008
JP H0328138 3/1991

(Continued)

OTHER PUBLICATIONS

"International Preliminary Report on Patentability (Form PCT/IPEA/409) of PCT/JP2023/000624", mailed on Jul. 28, 2024, with English translation thereof, pp. 1-10.

(Continued)

*Primary Examiner* — Jeremy R Severson
(74) *Attorney, Agent, or Firm* — JCIPRNET

(57) ABSTRACT

A paper feed roll includes a shaft body and an elastic body layer formed on the outer circumferential surface of the shaft body. The outer diameter of the elastic body layer is 10-50 mm, the outer circumferential surface of the elastic body layer is provided with, in the circumferential direction, 1-8 grooves extending in the axial direction, the grooves have a constant groove width in the depth direction or have a groove width that gradually decreases in the depth direction, the groove width of the grooves is 0.2-1.0 mm, and the groove depth of the grooves is 0.2-1.0 mm.

4 Claims, 2 Drawing Sheets

(52) U.S. Cl.
CPC .............. *B65H 2404/13163* (2013.01); *B65H 2515/84* (2013.01)

(56) References Cited

FOREIGN PATENT DOCUMENTS

| | | |
|---|---|---|
| JP | H0633853 | 5/1994 |
| JP | H07172614 | 7/1995 |
| JP | H08104444 | 4/1996 |
| JP | 2011173680 | 9/2011 |
| JP | 2018043852 | 3/2018 |

OTHER PUBLICATIONS

"International Search Report (Form PCT/ISA/210) of PCT/JP2023/000624", mailed on Apr. 4, 2023, with English translation thereof, pp. 1-6.
"Office Action of China Counterpart Application", issued on May 13, 2026, with English translation thereof, p. 1-p. 12.

* cited by examiner

PAPER FEED ROLL

CROSS-REFERENCE TO RELATED APPLICATION

This application is a continuation of PCT International Application No. PCT/JP2023/000624, filed on Jan. 12, 2023, which claims priority under 35 U.S.C § 119(a) to Japanese Patent Application No. 2022-011856, filed on Jan. 28, 2022. Each of the above application(s) is hereby expressly incorporated by reference, in its entirety, into the present application.

TECHNICAL FIELD

The disclosure relates to a paper feed roll that is suitably used in electrophotographic equipment such as copying machines, printers, and facsimiles that employ electrophotography.

DESCRIPTION OF RELATED ART

The paper feed roll is formed into a roll shape from an elastic material such as rubber. The paper is conveyed by the frictional force generated between the outer circumferential surface of the paper feed roll and the paper. When a large number of sheets of paper are conveyed by the paper feed roll, a paper conveyance failure tends to occur. If the number of paper conveyance failures increases, a user needs to contact a service person. The service life (time for replacement) of the paper feed roll is determined by the service person. The reality is that it is difficult for the user to determine the service life (time for replacement) of the paper feed roll.

Patent Literature 1 (Japanese Patent Application Laid-Open No. H07-172614) proposes a paper feed roll in which grooves are provided on the roll surface and the service life of the roll is determined by the time when the grooves disappear due to wear of the roll surface. According to this, the user can decide to replace the roll when the grooves on the roll surface disappear. However, the service life of the roll (time for replacement) cannot be determined merely by the amount of wear on the roll surface. For example, if the friction coefficient of the roll surface decreases due to paper dust generated from paper being accumulated on the roll surface, a paper conveyance failure may occur even if there is little wear on the roll surface.

The disclosure provides a paper feed roll in which it is easy to determine the service life of the roll.

SUMMARY

It has been found that the amount of wear on the roll and the service life of the roll are not certainly related, and it is easier to find a relationship between the amount of paper dust adhering to the roll surface and the service life of the roll than the amount of wear of the roll. The disclosure proposes that the service life of a roll can be determined from the relationship between a groove of a specific shape and the amount of paper dust accumulated in the groove.

That is, the paper feed roll according to the disclosure includes a shaft body and an elastic body layer formed on an outer circumferential surface of the shaft body. An outer diameter of the elastic body layer is 10 mm or more and 50 mm or less, grooves extending in an axial direction are formed in the outer circumferential surface of the elastic body layer in a number of 1 or more and 8 or less in a circumferential direction, the grooves have a constant groove width along a depth direction or have a groove width that gradually decreases along the depth direction, the groove width of the grooves is 0.2 mm or more and 1.0 mm or less, and a groove depth of the grooves is 0.2 mm or more and 1.0 mm or less.

It is particularly preferable that the grooves have a groove width that gradually decreases along the depth direction. The number of grooves in the circumferential direction is preferably 2 or more and 6 or less. The surface roughness Sp expressed as the maximum height of a bottom surface of the groove from an average surface is preferably 20 μm or more and 150 μm or less.

According to the paper feed roll according to the disclosure, the paper feed roll includes a shaft body and an elastic body layer formed on the outer circumferential surface of the shaft body. The outer diameter of the elastic body layer is 10 mm or more and 50 mm or less, grooves extending in the axial direction are formed in the outer circumferential surface of the elastic body layer in a number of 1 or more and 8 or less in the circumferential direction, the grooves have a constant groove width along the depth direction or have a groove width that gradually decreases along the depth direction, the groove width of the grooves is 0.2 mm or more and 1.0 mm or less, and the groove depth of the grooves is 0.2 mm or more and 1.0 mm or less. Since the service life of the roll can be determined from the relationship with the amount of paper dust accumulated in the groove, it is easy to determine the service life of the roll.

When having a groove width that gradually decreases along the depth direction, the grooves have a shape in which paper dust tends to accumulate. Moreover, since the shape makes it easy to visually observe that paper dust has accumulated, it becomes particularly easy to determine the service life of the roll from the relationship with the amount of paper dust accumulated in the grooves.

When the number of grooves in the circumferential direction is 2 or more and 6 or less, it becomes particularly easy to determine the service life of the roll from the relationship with the amount of paper dust accumulated in the grooves.

When the surface roughness Sp represented by the maximum height of the bottom surface of the groove from the average surface is 20 μm or more and 150 μm or less, the effect of retaining paper dust in the grooves is exemplary, making it difficult for paper dust to migrate from the grooves to other parts of the roll surface. Then, the decrease in the coefficient of friction on the roll surface due to paper dust is suppressed, and the paper dust accumulates in the grooves, thereby improving the accuracy of determining the service life of the roll.

DESCRIPTION OF EMBODIMENTS

Figure 1A:
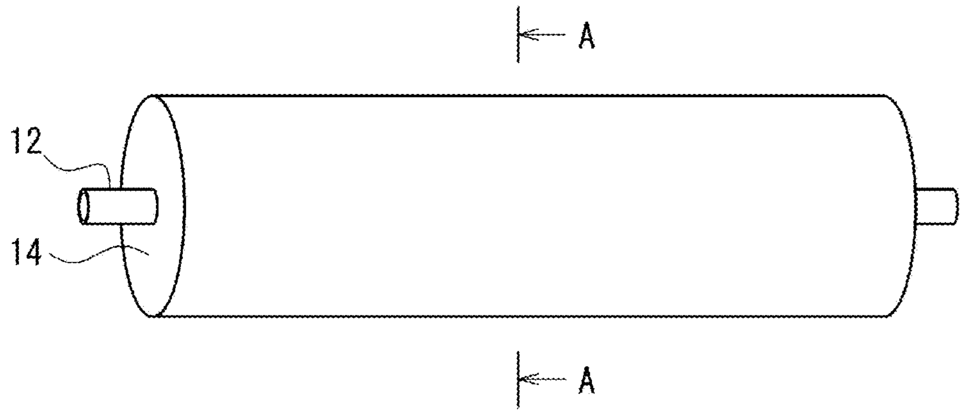
FIG. 1A is a schematic external view of a paper feed roll according to an embodiment of the disclosure.
Figure 1B:
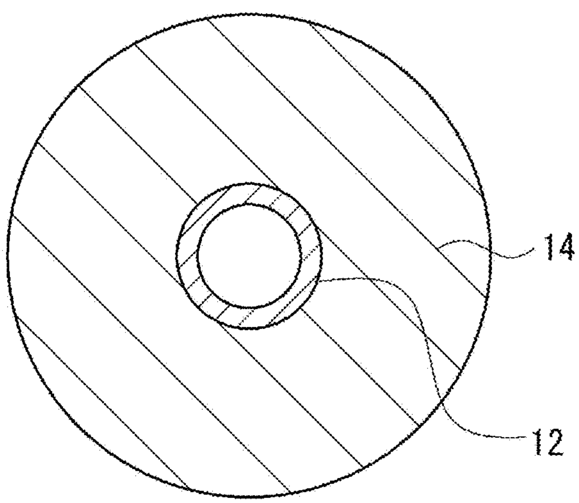
FIG. 1B is a cross-sectional view of FIG. 1A taken along a line A-A.
Figure 2A:
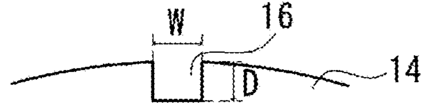
FIGS. 2A, 2B, and 2C are enlarged sectional views of the outer circumferential surface side of the elastic body layer of the paper feed roll.
Figure 2B:
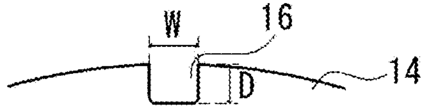
Figure 2C:
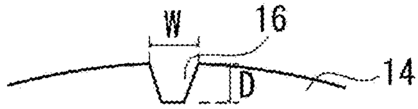

The paper feed roll according to the disclosure will be described in detail. FIG. 1A is a schematic external view of a paper feed roll according to an embodiment of the disclosure, and FIG. 1B is a cross-sectional view of FIG. 1A taken along a line A-A. FIGS. 2A, 2B, and 2C are enlarged sectional views of the outer circumferential surface side of the elastic body layer of the paper feed roll.

A paper feed roll 10 according to an embodiment of the disclosure includes a shaft body 12 and an elastic body layer 14 formed on an outer circumferential surface of the shaft body 12. The elastic body layer 14 is a base layer of the paper feed roll 10. The elastic body layer 14 is a layer that appears on the surface of the paper feed roll 10.

The shaft body 12 may be a solid body or a hollow body (cylindrical body) formed by metal or resin. Examples of metal materials include iron, stainless steel, and aluminum. The elastic body layer 14 may be bonded to the shaft body 12 via an adhesive layer (primer layer). Adhesives, primers, etc. may be made conductive if needed.

The elastic body layer 14 is formed in a roll shape on the outer circumferential surface of the shaft body 12 using an elastic material. On the outer circumferential surface of the elastic body layer 14, grooves 16 extending in an axial direction are formed in a number of 1 or more and 8 or less in a circumferential direction. The grooves 16 have a specific shape, and the service life of the roll can be determined from the relationship with the amount of paper dust accumulated in the grooves 16. The grooves 16 may be formed continuously from one end to the other in the axial direction on the outer circumferential surface of the elastic body layer 14, or may be formed in a portion in the axial direction. Note that the paper dust referred to here refers to dust, scraps, fibers, etc. discharged from paper, and also includes calcium carbonate, kaolin, etc. that are blended into paper. Paper dust particularly tends to be generated from paper produced overseas. Calcium carbonate and kaolin are amorphous and have a particle size of about 1 to 3 μm.

FIGS. 2A, 2B, and 2C each show an example of the shape of the groove 16. FIGS. 2A, 2B, and 2C each show a part of the outer circumferential surface of the radial cross section of the elastic body layer 14. The groove 16 in FIG. 2A has a U-shaped cross section and has a constant groove width W along the depth direction. The groove 16 in FIG. 2B has a U-shaped cross section and has a constant groove width W along the depth direction. In the groove 16 shown in FIG. 2B, the bottom corner of the groove 16 is rounded. The groove 16 in FIG. 2C has a V-shaped cross section and a groove width W that gradually decreases along the depth direction. The bottom surface of the groove 16 is flat. In the groove 16 of FIG. 2C, the bottom corner of the groove 16 may be rounded like the groove 16 of FIG. 2B.

As shown in FIGS. 2A, 2B, and 2C, since the grooves 16 formed on the outer circumferential surface of the elastic body layer 14 have the constant groove width W along the depth direction or have the groove width W that gradually decreases along the depth direction, paper dust tends to accumulate, and it is easy to visually observe that paper dust has accumulated. Therefore, it becomes easier to determine the service life of the roll from the relationship with the amount of paper dust accumulated in the grooves 16. In particular, if the grooves 16 formed on the outer circumferential surface of the elastic body layer 14 have a groove width that gradually decreases along the depth direction, due to ease of accumulation of paper dust and ease of visual observation, it becomes particularly easy to determine the service life of the roll from the relationship with the amount of paper dust accumulated in the grooves 16.

The groove width W of the grooves 16 is 0.2 mm or more and 1.0 mm or less, and a groove depth D of the grooves 16 is 0.2 mm or more and 1.0 mm or less. If either the groove width W or the groove depth D is less than 0.2 mm, the capacity of the grooves 16 for collecting paper dust is too small, paper dust accumulates in the grooves before a paper conveyance failure occurs, and the service life of the roll cannot be determined from the relationship with the amount of paper dust accumulated in the grooves 16. Furthermore, if either the groove width W or the groove depth D exceeds 1.0 mm, the capacity of the grooves 16 for collecting paper dust is too large, even when a paper conveyance failure occurs frequently, it is difficult to visually observe and determine whether paper dust has accumulated sufficiently in the grooves 16, and the service life of the roll cannot be determined from the relationship with the amount of paper dust accumulated in the grooves 16. When both the groove width W and the groove depth D are 0.2 mm or more and 1.0 mm or less, the service life of the roll can be determined from the relationship with the amount of paper dust accumulated in the grooves 16.

The groove width W of the grooves 16 is more preferably 0.3 mm or more, and still more preferably 0.4 mm or more. Moreover, the groove width W of the grooves 16 is more preferably 0.9 mm or less, and still more preferably 0.8 mm or less. The groove depth D of the grooves 16 is more preferably 0.3 mm or more, and still more preferably 0.4 mm or more. Moreover, the groove depth D of the grooves 16 is more preferably 0.9 mm or less, and still more preferably 0.8 mm or less.

The grooves 16 are formed in a number of 1 or more and 8 or less in the circumferential direction. If the number of grooves 16 is more than 8, the grooves 16 have a large influence on the paper conveyance performance, and the conveyance performance deteriorates. In particular, if an outer diameter Φ of the elastic body layer 14 is small, the roll may bounce and flutter (banding) when the roll rotates, and the paper cannot be conveyed. The number of grooves 16 in the circumferential direction is preferably 2 or more and 6 or less, from the viewpoint of making it particularly easy to determine the service life of the roll from the relationship with the amount of paper dust accumulated in the grooves 16. When multiple grooves 16 are formed in the circumferential direction, the grooves 16 are preferably formed at equal intervals and at equal positions in the circumferential direction.

It is preferable that the bottom surface of the groove 16 has appropriate roughness because a protrusion that is convex on the outside in the radial direction and a minute recess that is concave on the inside in the radial direction are formed. In this way, the effect of retaining paper dust in the grooves 16 is exemplary, making it difficult for paper dust to migrate from the grooves 16 to other parts of the roll surface. Then, the decrease in the coefficient of friction on the roll surface due to paper dust is suppressed, and the paper dust accumulates in the grooves 16, thereby improving the accuracy of determining the service life of the roll. The roughness of the bottom surface of the groove 16 can be expressed as surface roughness Sp, which is the maximum height of the bottom surface of the groove 16 from the average surface. The surface roughness Sp of the bottom surface of the groove 16 is preferably 20 μm or more and 150 μm or less. The surface roughness Sp of the bottom surface of the groove 16 is more preferably 30 μm or more, and still more preferably 50 μm or more. Further, the surface roughness Sp of the bottom surface of the groove 16 is more preferably 120 μm or less, and even more preferably 100 μm or less.

The outer diameter Φ of the elastic body layer 14 is 10 mm or more and 50 mm or less. When the outer diameter of the elastic body layer 14 is less than 10 mm, the nip with the paper is small and the amount of paper dust generated is small. Even when the amount of paper dust entering the grooves 16 decreases and a paper conveyance failure occurs frequently, it is difficult to visually observe and determine whether enough paper dust has accumulated in the grooves 16, and the service life of the roll cannot be determined from the relationship with the amount of paper dust accumulated in the grooves 16. Furthermore, if the outer diameter of the elastic body layer 14 is more than 50 mm, the nip with the paper is large and a large amount of paper dust is generated, resulting in a large amount of paper dust entering the grooves 16. Paper dust accumulates in the grooves before a paper conveyance failure occurs, and the service life of the roll cannot be determined from the relationship with the amount of paper dust accumulated in the grooves 16. The outer diameter of the elastic body layer 14 is more preferably 15 mm or more, and still more preferably 20 mm or more. Further, the outer diameter of the elastic body layer 14 is more preferably 45 mm or less, and still more preferably 40 mm or less.

The elastic body layer 14 preferably has a JIS-A hardness of 25 degrees or more and 85 degrees or less from the viewpoint of nip with paper. Further, the JIS-A hardness is more preferably 30 degrees or more and 80 degrees or less.

The elastic body layer 14 is formed by an elastic material such as rubber, elastomer, or resin. The material is not particularly limited as long as the material is a rubber-like elastic material. For example, known materials such as urethane rubber, hydrin rubber, silicone rubber, and EPDM can be used.

Various additives may be added to the elastic body layer 14 as needed. Examples of additives include lubricants, vulcanization accelerators, anti-aging agents, light stabilizers, viscosity modifiers, processing aids, flame retardants, plasticizers, fillers, dispersants, antifoaming agents, pigments, mold release agents, etc.

The thickness of the elastic body layer 14 is not particularly limited, and may be appropriately set within the range of 2 to 25 mm.

The elastic body layer 14 can be formed by molding using a mold. For example, a core material is placed coaxially in the hollow portion of a roll molding die, an uncrosslinked rubber composition is injected, and after heating and curing (crosslinking), the elastic body layer 14 in a tubular shape can be formed by demolding or the like. A mold having a convex portion having a shape corresponding to the groove 16 formed on the inner circumferential surface thereof can be used as a molding die. The grooves 16 in the elastic body layer 14 can be formed, for example, by mold transfer using the molding die. The convexo-concavity on the inner circumferential surface of the molding die can be formed by various convexo-concave forming methods such as electrical discharge machining, etching, shot blasting, and polishing. The paper feed roll 10 can be formed by inserting a shaft body 12 into the elastic body layer 14 formed into a cylindrical shape.

According to the paper feed roll 10 having the above configuration, since the grooves 16 formed on the outer circumferential surface of the elastic body layer 14 extend in the axial direction and have the constant groove width W along the depth direction or have the groove width W that gradually decreases along the depth direction, paper dust tends to accumulate, and it is easy to visually observe that paper dust has accumulated. Since the groove width W of the grooves 16 is 0.2 mm or more and 1.0 mm or less, and the groove depth D of the grooves 16 is 0.2 mm or more and 1.0 mm or less, the capacity of the grooves 16 for collecting paper dust is appropriate, and the service life of the roll can be determined from the relationship with the amount of paper dust accumulated in the grooves 16. Since the grooves 16 are formed in a number of 1 or more and 8 or less in the circumferential direction of the outer circumferential surface of the elastic body layer 14, the influence of the grooves 16 on the paper conveyance performance is small, and the conveyance performance does not deteriorate. By setting the outer diameter of the elastic body layer 14 to 10 mm or more and 50 mm or less, the nip with the paper becomes appropriate, and the amount of paper dust entering the grooves 16 becomes appropriate, so the service life of the roll can be determined from the relationship with the amount of paper dust accumulated in the grooves 16. As described above, the service life of the roll can be determined from the relationship with the amount of paper dust accumulated in the grooves 16, so it is easy to determine the service life of the roll.

Although the embodiments of the disclosure have been described above, the disclosure is not limited to the above-described embodiments, and various modifications can be made without departing from the spirit of the disclosure.

Example

Hereinafter, the disclosure will be described in detail using Examples and Comparative Examples.

An elastic body layer of a urethane rubber composition was formed on the outer circumference of a core material (Φ6, made of SUS304) using a cylindrical molding die having a protrusion extending along the axial direction on the inner circumferential surface. As a result, a paper feed roll having predetermined grooves on the outer circumferential surface of the elastic body layer was obtained. The shape of the groove is such that the groove width gradually decreases along the depth direction, as shown in FIG. 2C. In the table, Φ is the outer diameter of the elastic body layer, n is the number of grooves, width W is the groove width, and D is the groove depth. The groove width W and the groove depth D were measured by observing the radial cross section of the elastic body layer of the fabricated paper feed roll.

Using the fabricated paper feed roll, printing was repeated until a paper feed failure occurred, at the point where a paper feed failure occurred, the radial cross section of the elastic body layer of the paper feed roll was observed, and the amount of paper dust accumulated in the grooves was measured. In the table, the numbers 10 to 90 represent the amount of paper dust (filling rate) in the volume of the grooves. If the filling rate exceeded 100% before a paper feed failure occurred, it was evaluated as "-" Also, if the filling rate at the point where a paper feed failure occurred is 50% or more and 100% or less, it was marked as good "○", a case of more than 20% and less than 50% was marked as defective "Δ", and a case of 20% or less was marked as defective "x". The experimental results are shown in Tables 1 to 8 below.

TABLE 1

| Φ = 5 mm | | Depth D [mm] | | | | |
|---|---|---|---|---|---|---|
| n = 1 | | 0.1 | 0.2 | 0.6 | 1.0 | 1.1 |
| Width W [mm] | 0.1 | — | — | — | — | — |
| | 0.2 | — | 35/Δ | 30/Δ | 30/Δ | 20/x |
| | 0.6 | — | 30/Δ | 30/Δ | 25/x | 20/x |
| | 1.0 | — | 30/Δ | 25/x | 25/x | 10/x |
| | 1.1 | — | 20/x | 20/x | 10/x | 10/x |

TABLE 2

| Φ = 10 mm | | Depth D [mm] | | | | |
|---|---|---|---|---|---|---|
| n = 1 | | 0.1 | 0.2 | 0.6 | 1.0 | 1.1 |
| Width | 0.1 | — | — | — | — | — |
| W [mm] | 0.2 | — | 80/○ | 60/○ | 60/○ | 35/Δ |
| | 0.6 | — | 60/○ | 60/○ | 50/○ | 35/Δ |
| | 1.0 | — | 60/○ | 50/○ | 50/○ | 20/x |
| | 1.1 | — | 35/Δ | 35/Δ | 20/x | 20/x |

TABLE 3

| Φ = 50 mm | | Depth D [mm] | | | | |
|---|---|---|---|---|---|---|
| n = 1 | | 0.1 | 0.2 | 0.6 | 1.0 | 1.1 |
| Width | 0.1 | — | — | — | — | — |
| W [mm] | 0.2 | — | 90/○ | 75/○ | 75/○ | 40/Δ |
| | 0.6 | — | 75/○ | 75/○ | 50/○ | 40/Δ |
| | 1.0 | — | 75/○ | 50/○ | 50/○ | 25/x |
| | 1.1 | — | 40/Δ | 40/Δ | 25/x | 25/x |

TABLE 4

| Φ = 60 mm | | Depth D [mm] | | | | |
|---|---|---|---|---|---|---|
| n = 1 | | 0.1 | 0.2 | 0.6 | 1.0 | 1.1 |
| Width | 0.1 | — | — | — | — | — |
| W [mm] | 0.2 | — | — | — | — | — |
| | 0.6 | — | — | — | — | — |
| | 1.0 | — | — | — | — | — |
| | 1.1 | — | — | — | — | — |

TABLE 5

| Φ = 5 mm | | Depth D [mm] | | | | |
|---|---|---|---|---|---|---|
| n = 9 | | 0.1 | 0.2 | 0.6 | 1.0 | 1.1 |
| Width | 0.1 | NG | NG | NG | NG | NG |
| W [mm] | 0.2 | NG | NG | NG | NG | NG |
| | 0.6 | NG | NG | NG | NG | NG |
| | 1.0 | NG | NG | NG | NG | NG |
| | 1.1 | NG | NG | NG | NG | NG |

TABLE 6

| Φ = 10 mm | | Depth D [mm] | | | | |
|---|---|---|---|---|---|---|
| n = 8 | | 0.1 | 0.2 | 0.6 | 1.0 | 1.1 |
| Width | 0.1 | — | — | — | — | — |
| W [mm] | 0.2 | — | 80/○ | 60/○ | 60/○ | 35/Δ |
| | 0.6 | — | 60/○ | 60/○ | 50/○ | 35/Δ |
| | 1.0 | — | 60/○ | 50/○ | 50/○ | 20/x |
| | 1.1 | — | 35/Δ | 35/Δ | 20/x | 20/x |

TABLE 7

| Φ = 50 mm | | Depth D [mm] | | | | |
|---|---|---|---|---|---|---|
| n = 8 | | 0.1 | 0.2 | 0.6 | 1.0 | 1.1 |
| Width | 0.1 | — | — | — | — | — |
| W [mm] | 0.2 | — | 90/○ | 75/○ | 75/○ | 40/Δ |
| | 0.6 | — | 75/○ | 75/○ | 50/○ | 40/Δ |
| | 1.0 | — | 75/○ | 50/○ | 50/○ | 25/x |
| | 1.1 | — | 40/Δ | 40/Δ | 25/x | 25/x |

TABLE 8

| Φ = 60 mm | | Depth D [mm] | | | | |
|---|---|---|---|---|---|---|
| n = 9 | | 0.1 | 0.2 | 0.6 | 1.0 | 1.1 |
| Width | 0.1 | — | — | — | — | — |
| W [mm] | 0.2 | — | — | — | — | — |
| | 0.6 | — | — | — | — | — |
| | 1.0 | — | — | — | — | — |
| | 1.1 | — | — | — | — | — |

From Table 2, Table 3, Table 6, and Table 7, n=1 to 8, within the range of Φ10 mm or more and Φ50 mm or less, it can be seen that in a case where the groove width W is 0.2 mm or more and 1.0 mm or less, and the groove depth D is 0.2 mm or more and 1.0 mm or less, when a paper feed failure occurs, the filling rate of paper dust into the grooves is 50% or more and 100% or less, it may be visually observed and confirmed that paper dust has accumulated when a paper feed failure occurs, and the service life of the roll can be determined from the relationship with the amount of paper dust accumulated in the grooves.

As shown in Table 1, when Φ is 5 mm, the nip with the paper is small, so even if the groove width W and groove depth D are varied, the amount of paper dust entering the grooves is small, the filling rate of paper dust into the grooves when a paper feed failure occurs is low at less than 50%, and it is difficult to visually observe and determine whether enough paper dust has accumulated in the grooves. Therefore, the service life of the roll was unable to be determined from the relationship with the amount of paper dust accumulated in the grooves. In addition, as shown in Table 4, when Φ is 60 mm, the nip with the paper is large, so even if the groove width W and groove depth D are varied, the amount of paper dust entering the grooves increases, the paper dust accumulates in the groove before a paper conveyance failure occurs, and the service life of the roll was able to be determined from the relationship with the amount of paper dust accumulated in the grooves.

From Table 5, when n=9 and Φ is 5 mm, a phenomenon in which the roll bounced and fluttered during paper feeding was observed, and paper feeding was unable to be performed (NG). In addition, from Table 8, when n=9 and Φ is 60 mm, the nip with the paper is large, so even if the groove width W and groove depth D are varied, the amount of paper dust entering the grooves increases, the paper dust accumulates in the groove before a paper conveyance failure occurs, and the service life of the roll was unable to be determined from the relationship with the amount of paper dust accumulated in the grooves.

Moreover, from Table 2, Table 3, Table 6, and Table 7, even if n=1 to 8 and Φ is 10 mm or more and 50 mm or less, it can be seen that if the groove width W deviates from 0.2 mm or more and 1.0 mm or less, and the groove depth D deviates from 0.2 mm or more and 1.0 mm or less, either the filling rate exceeds 100% before a paper feed failure occurs or the filling rate of paper dust into the grooves when a paper feed failure occurs is less than 50%, and the service life of the roll cannot be determined from the relationship with the amount of paper dust accumulated in the grooves.

In addition, although the above examples show what was carried out with the groove shape shown in FIG. 2C, similar results were obtained also with the groove shapes shown in FIGS. 2A and 2B.

Although the embodiments and examples of the disclosure have been described above, the disclosure is not limited to the above-described embodiments and examples, and various modifications can be made without departing from the spirit of the disclosure.

What is claimed is:

1. A paper feed roll, comprising:

a shaft body and an elastic body layer formed on an outer circumferential surface of the shaft body, wherein an outer diameter of the elastic body layer is 10 mm or more and 50 mm or less, grooves extending in an axial direction are formed in the outer circumferential surface of the elastic body layer in a number of 1 or more and 8 or less in a circumferential direction, the grooves have a groove width that is constant along a depth direction or have a groove width that gradually decreases along the depth direction, the groove width of the grooves is 0.2 mm or more and 1.0 mm or less, and a groove depth of the grooves is 0.2 mm or more and 1.0 mm or less.

2. The paper feed roll according to claim 1, wherein the grooves have the groove width that gradually decreases along the depth direction.

3. The paper feed roll according to claim 1, wherein the number of grooves in the circumferential direction is 2 or more and 6 or less.

4. The paper feed roll according to claim 1, wherein surface roughness expressed as the maximum height of a bottom surface of the groove from an average surface is 20 μm or more and 150 μm or less.

* * * * *